(12) United States Patent
Konishi et al.

(10) Patent No.: US 9,287,577 B2
(45) Date of Patent: Mar. 15, 2016

(54) BIOFUEL CELL

(71) Applicants: UNICHARM CORPORATION, Ehime (JP); Hiroshima University, Hiroshima (JP)

(72) Inventors: Takayoshi Konishi, Kagawa (JP); Toshio Hiraoka, Kagawa (JP); Toshihide Kakizono, Hiroshima (JP)

(73) Assignees: Unicharm Corporation, Ehime (JP); Hiroshima University, Hiroshima (JP)

( * ) Notice: Subject to any disclaimer, the term of this patent is extended or adjusted under 35 U.S.C. 154(b) by 0 days.

(21) Appl. No.: 14/386,907

(22) PCT Filed: Mar. 22, 2013

(86) PCT No.: PCT/JP2013/058407
§ 371 (c)(1),
(2) Date: Sep. 22, 2014

(87) PCT Pub. No.: WO2013/141382
PCT Pub. Date: Sep. 26, 2013

(65) Prior Publication Data
US 2015/0050567 A1    Feb. 19, 2015

(30) Foreign Application Priority Data

Mar. 22, 2012 (JP) .................... 2012-066018

(51) Int. Cl.
| | |
|---|---|
| H01M 8/16 | (2006.01) |
| B09B 3/00 | (2006.01) |
| H01M 4/90 | (2006.01) |
| H01M 4/92 | (2006.01) |
| H01M 4/96 | (2006.01) |
| H01M 8/10 | (2006.01) |

(52) U.S. Cl.
CPC . *H01M 8/16* (2013.01); *B09B 3/00* (2013.01); *H01M 4/9041* (2013.01); *H01M 4/9083* (2013.01); *H01M 4/92* (2013.01); *H01M 4/96* (2013.01); *H01M 8/1004* (2013.01); *Y02E 60/527* (2013.01)

(58) Field of Classification Search
CPC .................................. H01M 8/16; B09B 3/00
See application file for complete search history.

(56) References Cited

U.S. PATENT DOCUMENTS

| | | |
|---|---|---|
| 2007/0218345 A1 | 9/2007 | Sakai et al. |
| 2009/0142627 A1 | 6/2009 | Shimomura et al. |
| 2012/0082869 A1* | 4/2012 | Rittmann ............... C12N 13/00 429/2 |
| 2012/0152835 A1* | 6/2012 | Cardenas ................ C02F 3/005 210/620 |

FOREIGN PATENT DOCUMENTS

| | | |
|---|---|---|
| JP | 2006-24555 A | 1/2006 |
| JP | 2007-90232 A | 4/2007 |

OTHER PUBLICATIONS

International Search Report from corresponding PCT application No. PCT/JP2013/058407 dated Jun. 25, 2013 (3 pgs).

\* cited by examiner

*Primary Examiner* — Jonathan Jelsma
(74) *Attorney, Agent, or Firm* — Brinks Gilson & Lione

(57) ABSTRACT

The biofuel cell has a positive electrode, a negative electrode, an external circuit electrically connecting the positive electrode and the negative electrode, a positive electrode region where the positive electrode is disposed, a negative electrode region where the negative electrode is disposed, and a proton permeable membrane disposed between the positive electrode region and the negative electrode region, and the negative electrode region houses a biocatalyst together with the crushed material. The negative electrode region is separated by a mesh into an electrode region and a crushed material region, the negative electrode is housed in the electrode region, and the crushed material is housed in the crushed material region.

20 Claims, 4 Drawing Sheets

BIOFUEL CELL

RELATED APPLICATION

This application is a 35 U.S.C. §371 national phase filing of International Patent Application No. PCT/JP2013/058407, filed Mar. 22, 2013, through which and to which priority is claimed under 35 U.S.C. §119 to Japanese Patent Application No. 2012-066018, filed Mar. 22, 2012.

TECHNICAL FIELD

The present invention relates to a biofuel cell.

BACKGROUND ART

From the standpoint of recent environmental protection in terms of global warming prevention, a fuel cell generating no carbon dioxide gas is attracting attention. A hydrogen fuel cell is representative of this fuel cell. However, a hydrogen fuel cell is disadvantageous in that a combustible gas such as hydrogen gas, natural gas, etc., must be used as the fuel (proton source). On the other hand, a fuel cell includes a biofuel cell using biomass as the proton source. A biofuel cell has the advantage of not using a combustible gas. In addition, although a biofuel cell results in carbon dioxide emissions, as a result of using a plant-derived biomass, it does not increase net carbon dioxide. Furthermore, a biofuel cell is being taken notice at present in light of recycling of organic resources, and various kinds of biofuel cells have been proposed.

One example thereof is PTL 1.

In the biofuel cell of PTL 1, a negative electrode chamber (fuel electrode chamber) provided with a negative electrode and a positive electrode chamber (oxygen electrode chamber) provided with a positive electrode are partitioned by a proton permeable membrane (diaphragm). In the negative electrode chamber, an electron mediator is present together with a biocatalyst such as enzyme capable of metabolically degrading the biomass. On the other hand, the positive electrode chamber is filled with an electrolytic solution containing, for example, a polyvalent metal ion (e.g., $Fe^{3+}$), and oxygen is blown thereinto.

In such a biofuel cell, an electron is produced in the negative electrode chamber due to biomass degradation by the biocatalyst. This electron is transferred to the negative electrode by the electron mediator. The electron reached the negative electrode works in an external circuit and then reaches the positive electrode. The electron reached the positive electrode reduces a high-valence polyvalent metal ion in the positive electrode chamber and produces a low-valence polyvalent metal ion ($Fe^{3+} \rightarrow Fe^{2+}$). Also, a proton is produced in the negative electrode chamber due to biomass degradation by the biocatalyst. This proton is introduced into the positive electrode chamber through the proton permeable membrane and on the positive electrode, is oxidized by oxygen together with the low-valence metal ion. As a result, water is produced and at the same time, the low-valence metal ion returns to the original high-valence metal ion. A series of these reactions are represented, for example, by the following formulae:

<Negative Electrode Chamber>

$C_6H_{12}O_6 + 6H_2O \rightarrow 6CO_2 + 24H^+ + 24e^-$

<Positive Electrode Chamber>

$e^- + Fe^{3+} \rightarrow Fe^{2+}$ $4H^+ + 4Fe^{2+} + O_2 \rightarrow 2H_2O + 4Fe^{3+}$ Such electrode reactions are continuously performed, whereby an electric current is produced to generate electricity.

RELATED ART

Patent Literature

PTL 1: Japanese Unexamined Patent Publication No. 2007-287542

SUMMARY OF THE INVENTION

Problems to be Solved by the Invention

As the fuel of such a biofuel cell, disposable diaper waste containing pulp and SAP (Super Absorbent Polymer) can be used. In this case, the disposable diaper waste is finely crushed so as to facilitate the degradation by the biocatalyst. However, this crushed material contains not only pulp and SAP but also a material that is non-degradable by the biocatalyst, such as plastic film. When a plastic film or the like is attached to the negative electrode surface, it is difficult to transfer the electron to the negative electrode, and the electricity generation efficiency may be reduced. The same problem may arise also when insufficiently degraded pulp or SAP is attached to the negative electrode.

Accordingly, an object of the present invention is to provide a biofuel cell capable of preventing reduction in electricity generation efficiency when disposable diaper waste is used as the fuel.

Means to Solve the Problems

In order to attain the above-described object, according to the present invention, there is provided a biofuel cell for generating electricity by recycling a crushed material of disposable diaper waste, comprising:

a positive electrode, a negative electrode, an external circuit electrically connecting the positive electrode and the negative electrode, a positive electrode region where the positive electrode is disposed, a negative electrode region where the negative electrode is disposed, wherein the negative electrode region houses a biocatalyst together with the crushed material, and a proton permeable membrane disposed between the positive electrode region and the negative electrode region, wherein the negative electrode region is separated by a mesh into an electrode region and a crushed material region, the negative electrode is housed in the electrode region, and the crushed material is housed in the crushed material region.

Further, the proton permeable membrane is preferably composed of a composite cation exchange membrane containing a cation exchange membrane and an anion exchange layer formed only on a side surface of the negative electrode region of the cation exchange membrane, since a proton produced in the negative electrode region can be selectively transferred to the positive electrode.

Further, an electron mediator is preferably housed in the negative electrode region, since the electron mediator transfers an electron produced in the negative electrode region to the negative electrode.

Further, the negative electrode is preferably made of a carbon fiber knitted in a lacing-like fashion, since the surface area of the negative electrode can be more increased by forming the negative electrode in a lacing-like fashion, and the electron transfer efficiency can be increased by forming the negative electrode from carbon.

Further, the number of openings of the mesh is preferably from 30 to 200 mesh, since attachment of a plastic film or the like to the negative electrode surface can be prevented without inhibiting an electron from reaching the negative electrode.

Further, the crushed material is preferably in a rectangular shape of 5×5 mm to 10×10 mm, since, if the size of the crushed material is larger than this range, the degradation takes much time, and if the size of the crushed material smaller than the range above, crushing requires a larger force.

Further, a crushed material feeder for feeding the crushed material to the crushed material region is preferably provided, since the crushed material consumed along with generation of electricity can be replenished, and electricity can be continuously generated.

Further, a crusher is preferably driven by an electric power supplied from the external circuit, since an electric power from outside is not necessary or can be reduced.

Further, a catalyst feeder for feeding a biocatalyst to the negative electrode region is preferably provided, since a biocatalyst can be replenished to the negative electrode region, and electricity can be continuously generated.

Further, an electron mediator feeder for feeding an electron mediator to the negative electron region is preferably provided, since the electron mediator can be replenished to the negative electrode region, and electricity can be continuously generated.

Further, it is preferred that the crushed material region is formed in the central part of the negative electrode region and the electrode region is formed in the peripheral part of the negative electrode region, since the entire circumference of the crushed material region is adjacent to the electrode region and therefore, the electricity generation efficiency can be increased.

Furthermore, it is preferred that the electrode region is formed in the central part of the negative electrode region and the crushed material region is formed in the peripheral part of the negative electrode region, since the entire circumference of the electrode region is adjacent to the crushed material region and therefore, the electricity generation efficiency can be increased.

Further, a stirrer is preferably provided in the crushed material region, since degradation of the crushed material can be promoted by stirring the biocatalyst and crushed material in the negative electrode chamber.

Further, the positive electrode is preferably a platinum electrode, a copper electrode, an iron electrode, a gold electrode or a titanium electrode, since the electricity generation efficiency can be increased.

Further, the positive electrode region is preferably the atmosphere, since an apparatus for feeding oxygen to the positive electrode region is not necessary.

Technical Advantage of the Invention

According to the present invention, reduction in electricity generation efficiency can be prevented when using disposable diaper waste as the fuel.

The present invention will be more fully understood from the accompanying drawings and the preferred embodiments of the present invention.

DESCRIPTION OF EMBODIMENT

Figure 1:
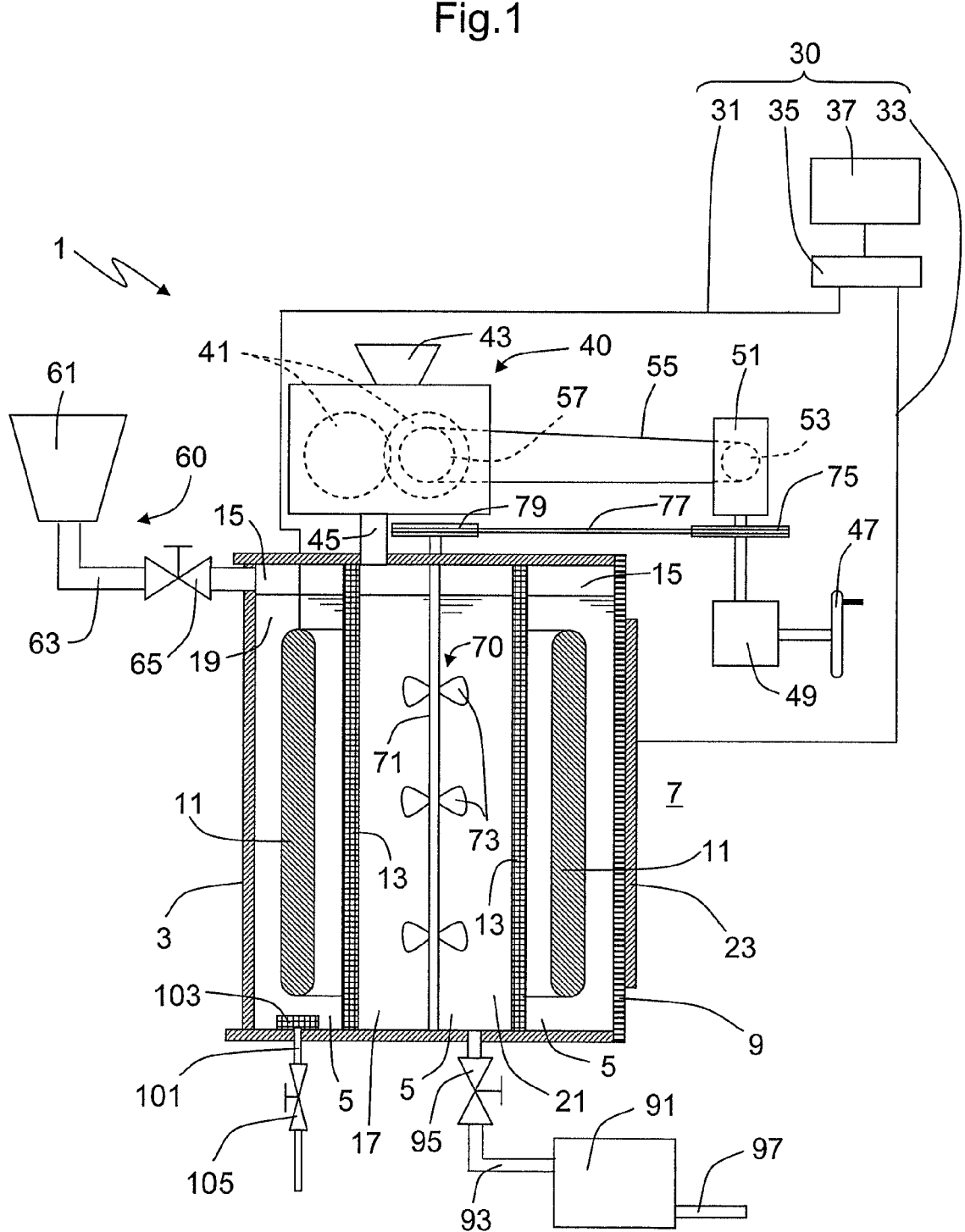
FIG. 1 is a schematic view of the biofuel cell in a first embodiment.

The present invention is described in more detail by referring to the drawings above. Please note that for better understanding of the present invention and simplifying the drawings, the drawing may not be depicted in the same size, scale and shape as those of the actual component.

(First Embodiment)

Now, the biofuel cell 1 in a first embodiment is described below by referring to FIG. 1. In this biofuel cell 1, a disposable diaper waste, more specifically, pulp (cellulose) contained in the absorber of the disposable diaper, is used as the fuel.

Referring to FIG. 1, the biofuel cell 1 comprises a bottomed cylindrical negative electrode chamber 3. A negative electrode region 5 is defined inside the negative electrode chamber 3.

The biofuel cell 1 further comprises a positive electrode region 7 defined outside the negative electrode chamber 3.

For example, on one side surface of the negative electrode chamber 3, that is, between the negative electrode region 5 and the positive electrode region 7, a proton exchange membrane 9 for selectively passing a proton from the negative electrode region 5 to the positive electrode region 7 is provided.

Figure 2:
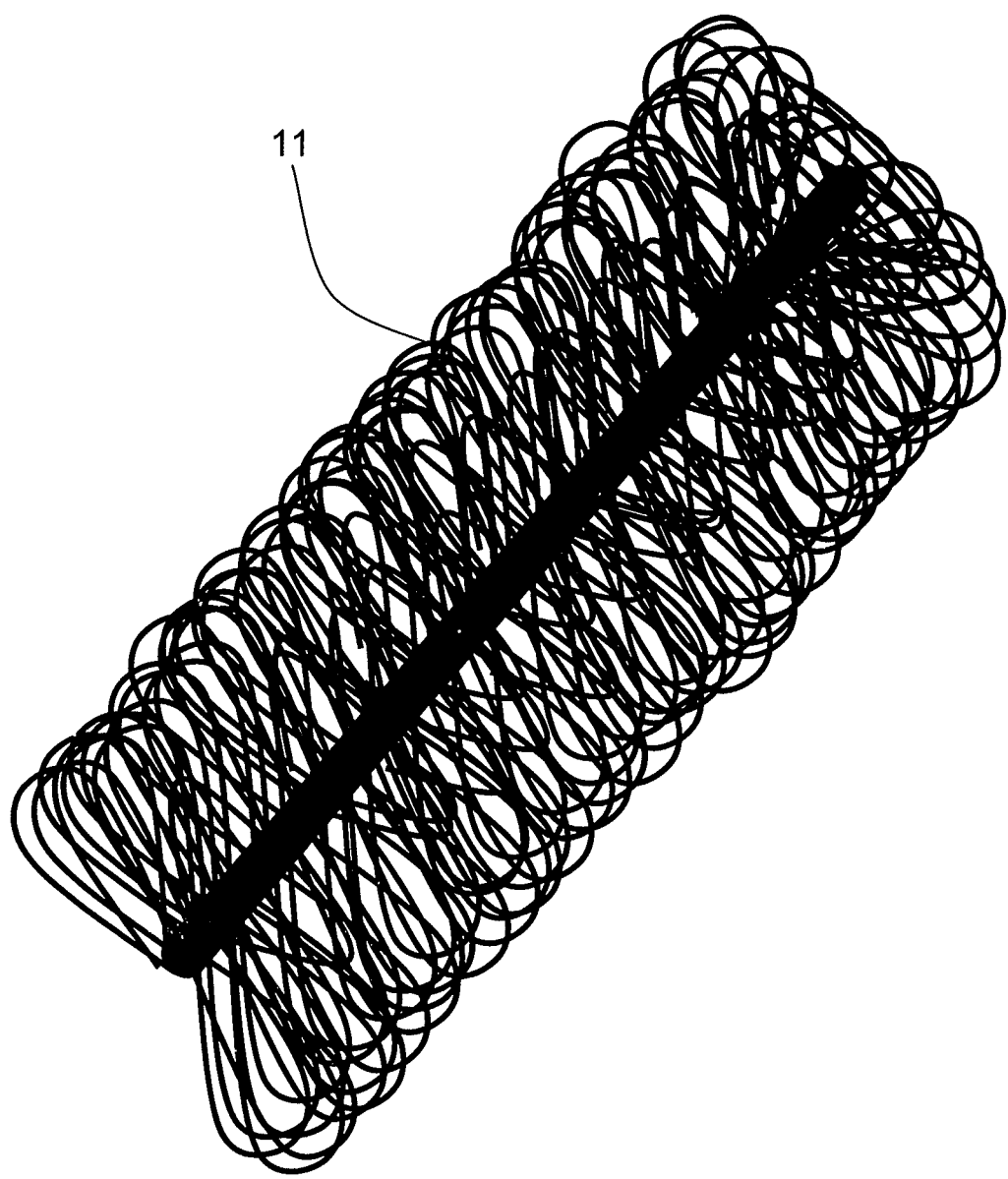
FIG. 2 is a partial perspective view of the negative electrode.

A negative electrode 11 forming an overall cylindrical shape is provided in the negative electrode region 5. In the first embodiment, the negative electrode 11 is made of a carbon fiber knitted in a lacing-like fashion as shown in FIG. 2.

Again referring to FIG. 1, a cylindrical mesh 13 is further provided in the negative electrode region 5 of the first embodiment. The negative electrode region 5 is separated, in a fluid flowable manner, by this mesh 13 into an electrode region 15 located in the peripheral part of the negative electrode region 5 and a crushed material region 17 located in the central part of the negative electrode region 5. The above-described negative electrode 11 is housed in this electrode chamber 15.

In the first embodiment, the number of openings of the mesh 13 is 100 mesh.

An acclimated sludge 19 is housed in the negative electrode region 5, that is, in the electrode region 15 and the crushed material region 17. The acclimated sludge 19 includes a biocatalyst for degrading the pulp and an electron mediator as an electron transfer agent. On the other hand, a crushed material 21 of disposable diaper waste is housed in the crushed material region 17.

The positive electrode region 7 is constituted by the atmosphere.

A plate-shaped positive electrode 23 is disposed in the positive electrode region 7. In the first embodiment, the positive electrode 23 is abutted against the proton exchange membrane 9 in the positive electrode region 7.

Also, in the first embodiment, the positive electrode 23 is made of platinum. In another embodiment, the positive electrode 23 is made of, for example, copper, iron, gold or titanium.

The biofuel cell 1 in the first embodiment further comprises an external circuit 30. The external circuit 30 includes a negative electrode-side electric wire 31 electrically connected to the negative electrode 11, a positive electrode-side electric wire 33 electrically connected to the positive electrode 23, an electronic control circuit 35 electrically connected to the negative electrode-side electric wire 31 and the positive electrode-side electric wire 33, and a battery 37 electrically connected to the electronic control circuit 35 and capable of storing electricity. The electronic control circuit 35 controls the operation of storing electricity in the battery 37.

The biofuel cell 1 in the first embodiment further comprises a crusher 40 for producing a crushed material 21 of disposable diaper waste, for example, above the negative electrode chamber 3. The crusher 40 used here is a known two-shaft crusher comprising a pair of crushing blades 41. A disposable diaper introduction hopper 43 opened upwardly is provided at the inlet of the crusher 40, and a crushed material charging pipe 45 communicating with a negative electrode region 5, particularly with a crushed material region 17, is provided at the outlet of the crusher 40.

In the first embodiment, the crusher 40 is of a hand-turned type. The crusher 40 has a hand-turned handle 47, a driving pulley 53 connected to the hand-turned handle 47 through a first decelerator 49 and a second decelerator 51, and a driven pulley 57 connected to the driving pulley 53 through a drive belt 55. The driven pulley 57 is connected to the pair of crushing blades 41.

When feeding of a crushed material 21 to the crushed material region 17 of the negative electrode region 5 is required, a disposable diaper waste is charged into the disposable diaper introduction hopper 43, and the hand-turned handle 47 is rotated. As a result, a power is transmitted to the pair of crushing blades 41 in the crusher 40 through the first decelerator 49, the second decelerator 51, the driving pulley 53, the drive belt 55 and the driven pulley 57, whereby the disposable diaper waste is crushed and a crushed material 21 is produced. The crushed material 21 which has been produced then falls down through the crushed material charging pipe 45 and is introduced into the crushed material region 17.

The crushed material 21 can be formed in various shapes and various sizes. In the first embodiment, the crushed material 21 is in a rectangular shape of about 5 mm×5 mm.

The biofuel cell 1 in the first embodiment further comprises an acclimated sludge feeder 60. The acclimated sludge feeder 60 comprises an acclimated sludge charging hopper 61, an acclimated sludge charging pipe 63 connecting the outlet of the acclimated sludge charging hopper 61 to the negative electrode region 5, and an acclimated sludge charging valve 65 disposed in the acclimated sludge charging pipe 63. The acclimated sludge charging valve 65 is usually closed. When feeding of the acclimated sludge 19, that is, the biocatalyst and the electron mediator, into the negative electrode region 5 is required, the acclimated sludge 19 is charged into the acclimated sludge charging hopper 61, and the acclimated sludge charging valve 65 is opened. As a result, the acclimated sludge 19 is fed into the negative electrode region 5 through the acclimated sludge charging pipe 63.

Incidentally, in the first embodiment, as described above, a biocatalyst and an electron mediator are contained in the acclimated sludge 19. Accordingly, the acclimated sludge feeder 60 acts as a biocatalyst feeder and an electron mediator feeder.

The biofuel cell 1 in the first embodiment further comprises a stirrer 70 disposed in the crushed material region 17. The stirrer 70 comprises a stirring shaft 71 and a stirring blade 73. In the first embodiment, the stirrer 70 further comprises the hand-turned handle 47 shared in common with the crusher 40, a driving pulley 75 connected to the hand-turned handle 47 through the first decelerator 49, and a driven pulley 79 connected to the driving pulley 75 through a drive belt 77. The driven pulley 79 is connected to the stirring shaft 71.

When operation of the stirrer 70 is required, the hand-turned handle 47 is rotated. As a result, the stirring blade 73 is rotated, and the crushed material 21 and the acclimated sludge 19 in the crushed material region 17 are stirred.

The biofuel cell 1 further comprises a residue purification unit 91, a residue discharging pipe 93 connecting the bottom of the crushed material region 17 and the inlet of the residue purification unit 91 to each other, a residue discharging valve 95 disposed in the residue discharging pipe 93, and an exhaust tube 97 connected to the outlet of the residue purification unit 91. The residue discharging valve 95 is usually closed. When the residue discharging valve 95 is opened, the residue in the crushed material region 17 is introduced into the residue purification unit 91 through the residue discharging pipe 93 and purified. The purified residue is discharged from the residue purification unit 91 through the exhaust tube 97. The residue contains non-degradable disposable diaper material such as plastic film and rubber thread, other than the acclimated sludge 19. In another embodiment, the residue is taken out from the top opening of the crushed material region 17. The residue taken out is treated in a septic tank or an incinerator.

The biofuel cell 1 in the first embodiment further comprises a liquid discharging pipe 101 connected to the bottom of the electrode region 15 of the negative electrode region 5, a mesh 103 covering the inlet of the liquid discharging pipe 101 located in the electrode region 15, and a liquid valve 105 disposed in the liquid discharging pipe 101. The liquid valve 105 is usually closed. When the liquid valve 105 is opened, the liquid in the negative region 5, for example, waste liquid, is discharged to the outside of the negative electrode region 5. The discharged liquid is treated, for example, in a toilet or a septic tank. In another embodiment, the liquid discharging pipe 101 is connected to the bottom of the crushed material region 17 of the negative electrode region 5.

The electricity generating operation of the biofuel cell 1 in the first embodiment is described below.

In the crushed material region 17, pulp contained in the crushed material 21 is degraded, i.e., oxidized, by the biocatalyst, as a result, an electron and a proton are produced.

The produced electron is transported to the negative electrode 11 by the electron mediator. In this case, the electron mediator seizes an electron from the inside to the outside of a cellulose cell. The electron mediator is converted from an oxidized form to a reduced form by seizing of an electron and transports the electron to the cell exterior, due to electron-withdrawing property of the electron mediator. The oxidation degree is usually high at the cell exterior compared with the cell interior and therefore, the electron mediator of a reduced form returns to an oxidized form by giving the electron to the negative electrode 11. Subsequently, the electron mediator again seizes an electron.

Alternatively, the electron reaches the negative electrode 11 by itself.

The electron reached the negative electrode 11 reaches the positive electrode 23 through the external circuit 30.

On the other hand, the proton moves to the positive electrode 23 by selectively passing through the proton exchange membrane 9.

Subsequently, on the positive electrode 23, an electron and a proton are passively reacted with oxygen in the atmosphere to produce water, as follows:

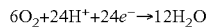

$$6O_2 + 24H^+ + 24e^- \rightarrow 12H_2O$$

These operations are repeatedly performed, whereby electricity can be generated by the biofuel cell 1. In the first embodiment, the generated electric power is charged in the battery 37.

The biofuel cell 1 in the first embodiment is operated as follows.

First, the acclimated sludge charging valve 65 is opened, and acclimated sludge 19 is introduced into the negative electrode region 5 through the acclimated sludge charging pipe 63. Subsequently, a disposable diaper waste is introduced into the disposable diaper waste introduction hopper 43, and the hand-turned handle 47 is rotated to actuate the crusher 40. As a result, a crushed material 21 is introduced into the crushed material region 17 through the crushed material charging pipe 45.

In this case, since the stirrer 70 is actuated, the crushed material 21 and the acclimated sludge 19 are successfully mixed, and the degradation of pulp by a biocatalyst is promoted. Even after the crushed material 21 is introduced into the crushed material region 17, the stirrer 70 is continuously actuated, whereby degradation of pulp by a biocatalyst is promoted.

At this time, the mesh 13 separates the electrode region 15 from the crushed material region 17. As a result, the crushed material 21 stays in the crushed material region 17 without transferring to the electrode region 15, and attachment of the crushed material 21 to the surface of the negative electrode 11 is prevented, so that the probability of an electron in the negative electrode region 5 reaching the negative electrode 11 can be increased and in turn, the electricity generation efficiency can be raised.

Incidentally, there is also a possibility that a partially degraded pulp portion passes through the mesh 13 and reaches the electrode region 15 from the crushed material region 17. However, since this pulp portion is of a fairly small dimension, scarcely affects the electricity generation efficiency. In addition, the acclimated sludge 19 is also present in the electrode region 15, and the degradation of pulp occurs also in the electrode region 15.

In the first embodiment, the electrode region 15 is located in the peripheral part of the negative electrode region 5 and a crushed material region 17 is located in the central part of the negative electrode region 5. As a result, the entire circumference of the electrode region 15 is adjacent to the crushed material region 17, so that the probability of an electron reaching the negative electrode 11 can be increased and the electricity generation efficiency can be raised.

In the first embodiment, as described above, the number of openings of the mesh 13 is 100 mesh. However, considering electricity generation efficiency, the number of openings of the mesh 13 is preferably from 30 to 200 mesh, since, if the number of openings of the mesh 13 is less than 30 mesh, the mesh pitch is too large and therefore, a crushed material 21 portion that is not sufficiently degraded or not degraded may pass through the mesh 13 and attach to the surface of the negative electrode 11 so as to reduce the electricity generation efficiency. On the other hand, if the number of openings of the mesh 13 is more than 200 mesh, the mesh pitch is too small, and as a result, the mesh may be clogged with the degraded pulp and inhibit an electron from reaching the negative electrode 11.

In the biofuel cell 1 of the first embodiment, along with the progress of degradation in the negative electrode region 5, the amount of the pulp portion of the crushed material 21 and the amount of active biocatalyst are decreased. Therefore, the crushed material 21 is replenished to the negative electrode region 5 from the crusher 40. Also, acclimated sludge 19 containing a biocatalyst and an electron mediator is replenished from the acclimated sludge feeder 60. Such replenishment is advantageous in that the biofuel cell 1 can be made to continuously generate electricity.

In the first embodiment, as described above, the negative electrode 11 is made of a carbon fiber knitted in a lacing-like fashion. Due to such configuration, the surface area of the negative electrode 11 can be increased, compared with an electrode having a flat surface, so that the probability of an electron reaching the surface of the negative electrode 11 can be increased and in turn, the electricity generation efficiency can be raised.

However, the configuration of the negative electrode 11 is not limited to the lacing-like configuration. In another embodiment, the negative electrode 11 takes on an arbitrary structure such as mesh-like or grid-like configuration. The material is also not limited only to a carbon fiber. In another embodiment, the negative electrode 11 is made of iron, nickel, platinum, titanium/platinum, carbon stainless steel, etc.

The proton exchange membrane 9 is formed by providing an anion exchange layer on the side surface of the negative electrode region 5 of a cation exchange membrane. The cation exchange membrane used for the formation of the proton exchange membrane 9 is not particularly limited and may be a known cation exchange membrane. As the cation exchange membrane, for example, a cation exchange membrane having an ion exchange group such as sulfonic acid group, carboxylic acid group, phosphonic acid group, sulfuric acid ester group, thiol group, and active group capable of forming a chelate structure with a heavy metal, can be used. As for the kind, model, etc., of the cation exchange membrane, which are dependent on the production method, the cation exchange membrane may be of any type, such as polymerized type, condensed type, uniform type and non-uniform type. Furthermore, the presence or absence of a reinforcing material used for reinforcement and the material for the resin having bonded thereto an ion exchange group (usually, a hydrocarbon-based resin or a fluororesin is used) are also not particularly limited. However, in view of dimensional stability, electrical performance and the like, a hydrocarbon-based cation exchange membrane in which an olefin-based resin or a styrene-based resin is used as the main polymer and a cation exchange group such as sulfonic acid group is introduced into the polymer, is suitable as the proton exchange membrane 9.

Also, the cation exchange membrane may be usually sufficient if it has a cation exchange capacity of 0.1 [meq/g dry membrane] or more, particularly from 0.5 to 3 [meq/g dry membrane]. The thickness of the cation exchange membrane is not particularly limited but in general, is preferably on the order of 0.01 to 5.0 mm. Furthermore, the cation exchange membrane may be a membrane used in a hydrous state or a waterless state. However, usually, a membrane used in a hydrous state is preferred. The cation exchange group in the membrane may be either a hydrogen type or a salt type, and furthermore, salts, an acid, a base and other substances may be contained in the membrane.

For the formation of an anion exchange layer on one surface of the above-described cation exchange membrane, the following known methods are used without any limitation. The method includes, for example, a method where a substance having a large molecule weight and capable of becoming a cation is adsorbed to the membrane surface to thereby form an anion exchange layer, described in Japanese Examined Patent Publication No. S46-23607, No. S47-3081, etc.;

a method where a vinyl compound having two or more quaternary ammonium bases and one or two vinylbenzyl groups, represented by a specific formula, or a polymer of the vinyl compound is caused to be present on the surface of a cation exchange membrane, described in Japanese Unexamined Patent Publication No. S56-50933, etc.;

a method where a glue-like substance working out to an anion exchange membrane is coated and firmly attached by irradiation with radiation to form an anion exchange layer, described in Japanese Examined Patent Publication No. S38-16633;

a method where a cation exchange membrane and an anion exchange membrane are laminated together by a polyethyleneimine-epichlorohydrin mixture and cured/adhered, described in Japanese Examined Patent Publication No. S32-3962;

a method where a cation exchange membrane and an anion exchange membrane are adhered with an ion exchangeable adhesive, described in Japanese Examined Patent Publication No. S34-3961;

a method where joining surfaces of a cation exchange membrane and an anion exchange membrane are coated with a paste-like mixture of a fine powdery strongly basic anion or strongly acidic cation exchange resin and a thermoplastic, electrically insulating resin solution and pressure-bonded, described in Japanese Examined Patent Publication No. S35-14531;

a method of depositing, on the surface of an ion exchange membrane, a mixture of a dispersion of an ion exchange resin having an opposite electric charge and a matrix polymer, described in Japanese Unexamined Patent Publication No. S53-37190; and a method where a sheet-like material obtained by impregnation-polymerizing a polyethylene film with a styrene or a divinylbenzene is held by a stainless steel-made frame, one side thereof is sulfonated, the sheet is thereafter removed, and the remaining portion is chloromethylated, followed by amination, described in U.S. Pat. No. 3,562,139.

In addition, for example, a method of forming an anion exchange layer by casting, coating or spraying a solution of a polymer containing an anion exchange group which is dissolved in a solvent or a precursor solution of the polymer, on one surface of the cation exchange membrane may also be employed.

The anion exchange layer formed as above on the cation exchange membrane should have properties at the level of not impairing the proton permeability of the cation exchange membrane, and, for example, the thickness thereof is usually, preferably on the order of 0.01 to 100 μm. Further, the anion exchange capacity of the anion exchange layer is preferably on the order of 0.001 to 0.4 [meq/g dry membrane].

Next, the operation of the proton exchange membrane 9 of the first embodiment that is a cation exchange membrane comprising an anion exchange layer on one surface thereof is described below.

For example, the proton permeable membrane constructed from a fluororesin-based cation exchange membrane such as Nafion (registered trademark) produced by DuPont exhibits excellent proton permeability for a solution not containing an electron mediator, but its proton permeability for a solution containing an electron mediator is greatly reduced. On the other hand, the proton exchange membrane of the first embodiment exhibits proton permeability slightly inferior to the fluororesin-based proton exchange membrane for a solution not containing electron mediator, but exhibits excellent proton permeability for a solution containing an electron mediator, compared with a proton exchange membrane composed of the above-described fluororesin-based cation exchange membrane.

The reason why the proton exchange membrane of the first embodiment exhibits excellent liquid permeability particularly for a solution containing an electron mediator is not clearly elucidated but is presumed as follows.

The electron mediator used in the negative electrode region 5 of the biofuel cell 1 is a highly hydrophobic substance and exhibits high adsorbability for a cation exchange membrane such as fluororesin-based resin. Therefore, the electron mediator is adsorbed to the membrane surface, and as a result, the proton permeability for a solution containing an electron mediator is reduced. On the other hand, since, in the proton exchange membrane of the first embodiment, an anion exchange layer is formed on the surface of the cation exchange membrane, adsorption of the electron mediator is suppressed by the anion exchange layer. Therefore, it is assumed that reduction in the proton permeability due to adsorption of the electron mediator can be effectively avoided and excellent proton permeability can be maintained.

Also, in the proton exchange membrane 9 of the first embodiment, it is important that the anion exchange layer is formed only on one surface of the cation exchange membrane and this anion exchange layer is disposed to face toward the negative electrode region 5, because if the anion exchange layer is provided on both surfaces of the cation exchange membrane, the anion exchange layer facing the side of the positive electrode region 7 does not work anything more than merely reducing the proton permeability. That is, the anion exchange layer that functions to prevent adsorption of the electron mediator and therefore, this anion exchange layer is disposed to face toward the negative electrode region 5, but such an anion exchange layer is one to exchange an anion and deters permeation of a proton by electric repulsion thereof. Even in the case of a proton exchange membrane where an anion exchange layer is formed only on one surface, when the cation exchange membrane is disposed so that the anion exchange layer faces toward the positive electrode region 7, all the same as above, the cation permeability is reduced.

In the first embodiment, the above-described cation exchange membrane comprising an anion exchange layer on one surface thereof is used as the proton exchange membrane of the biofuel cell, whereby a stable electrode reaction can be performed by effectively passing a proton and electricity can be stably generated over a long period of time.

The size of the crushed material 21 in the first embodiment is 5 mm×5 mm. However, the crushed material is preferably formed in a rectangular shape of 5×5 mm to 10×10 mm. If the size is more than 10 mm×10 mm, a long time is taken until the crushed material 21 is dispersed in the negative electrode region 5, whereas if the size is less than 5 mm×5 mm, the crushing requires a large force. In particular, in the first embodiment, the power is produced by the hand-turned handle 47 and therefore, in the case of a user that is not very strong (for example, a woman), easy hand-turning is difficult.

The acclimated sludge 19 used in the first embodiment is sludge containing a mixed microbial population. This mixed microbial population contains a biocatalyst such as cellulolytic fungus. The acclimated sludge 19 has an activity for decomposing polymers such as cellulose and pectin and also has high autoagglutination. The sedimentation coefficient $SV_{30}$ indicative of settling and separation of the microorganism from purified water is approximately from 20 to 40%, and the acclimated sludge 19 is a composite system of a wild yeast such as genera *Hansenula, Kluybaromyces, Candida, Trichosporon, Pichia, Yarrowia* and *Debaryomyces*, and other aerobic bacteria contained in the normal active sludge. The acclimated sludge 19 used in the first embodiment is a mixed microbial sludge having high cellulolytic activity, since carboxymethyl cellulose is acclimated to and cultured on a carbon source for 3 years or more and acclimated even to crushed pulp for 2 years or more.

However, the acclimated sludge 19 is not limited to the above-described sludge, and as long as a biocatalyst capable of degrading the portion made of pulp, etc. of the disposable diaper waste is contained, any sludge may be used. The microbial population capable of producing an enzyme for degrading cellulose that is the body of pulp includes, for example, IDECOMPO (registered trademark) of Idemitsu Kosan Co., Ltd. commercially available for the decomposition treatment of cut grass produced in a golf course, etc., KATAOKA fungus (BIOCORE (trademark)) of Kataoka & Co., Ltd. commercially available for the decomposition treatment of general raw garbage, etc., can be used.

As described above, the electron mediator changes between an oxidized form and a reduced form during seizing and transfer of an electron. Accordingly, when an electron mediator having an appropriate electron-withdrawing property (or oxidation-reduction potential) is selected, the process of seizing and transferring an electron efficiently proceeds.

In the first embodiment, an inexpensive oxidation-reduction reagent having relatively high solubility, such as methylene blue, is used for the electron mediator. Methylene blue has the advantage of, for example, exhibiting no biodegradability under anoxic conditions and because of its oxidation-reduction potential of −21 mV, being suitable for seizing an electron from the electron transfer system of a biocatalyst.

As the electron mediator, other various materials are known. In another embodiment, for example, neutral red is used as the electron mediator.

However, even without using an electron mediator, if an electron produced at the time of degradation of pulp directly reaches the negative electrode 11, electricity can be generated. Furthermore, in recent years, it has become known that a biocatalyst itself secretes a substance having an electron mediator activity. In addition, the existence of electron-producing bacteria capable of exposing an electron-transferring protein on the cell wall and releasing an electron directly to the electrode has been revealed. Therefore, in another embodiment, an electron mediator is not present in the negative electrode region 5.

Incidentally, on the positive electrode 23, an electron and a proton produced from the crushed material 21 react with molecular oxygen, and therefore, this reaction can be taken as an aerobic reaction. In a normal aerobic reaction, sufficient aeration and stirring are necessary so as to give a required amount of oxygen through the microbial cell membrane. However, in the biofuel cell 1 of the first embodiment, since the positive electrode 23 is exposed to the atmosphere, an oxidation-reduction reaction can be caused to proceed by a simple configuration.

In another embodiment, similarly to the above-described biofuel cell of PTL 1, a positive electrode region 7 filled with an electrolytic solution containing a polyvalent metal ion is provided.

(Second Embodiment)

The biofuel cell 1 in a second embodiment is described below by referring to FIG. 3. As for the second embodiment, only different points from the first embodiment are explained.

Figure 3:
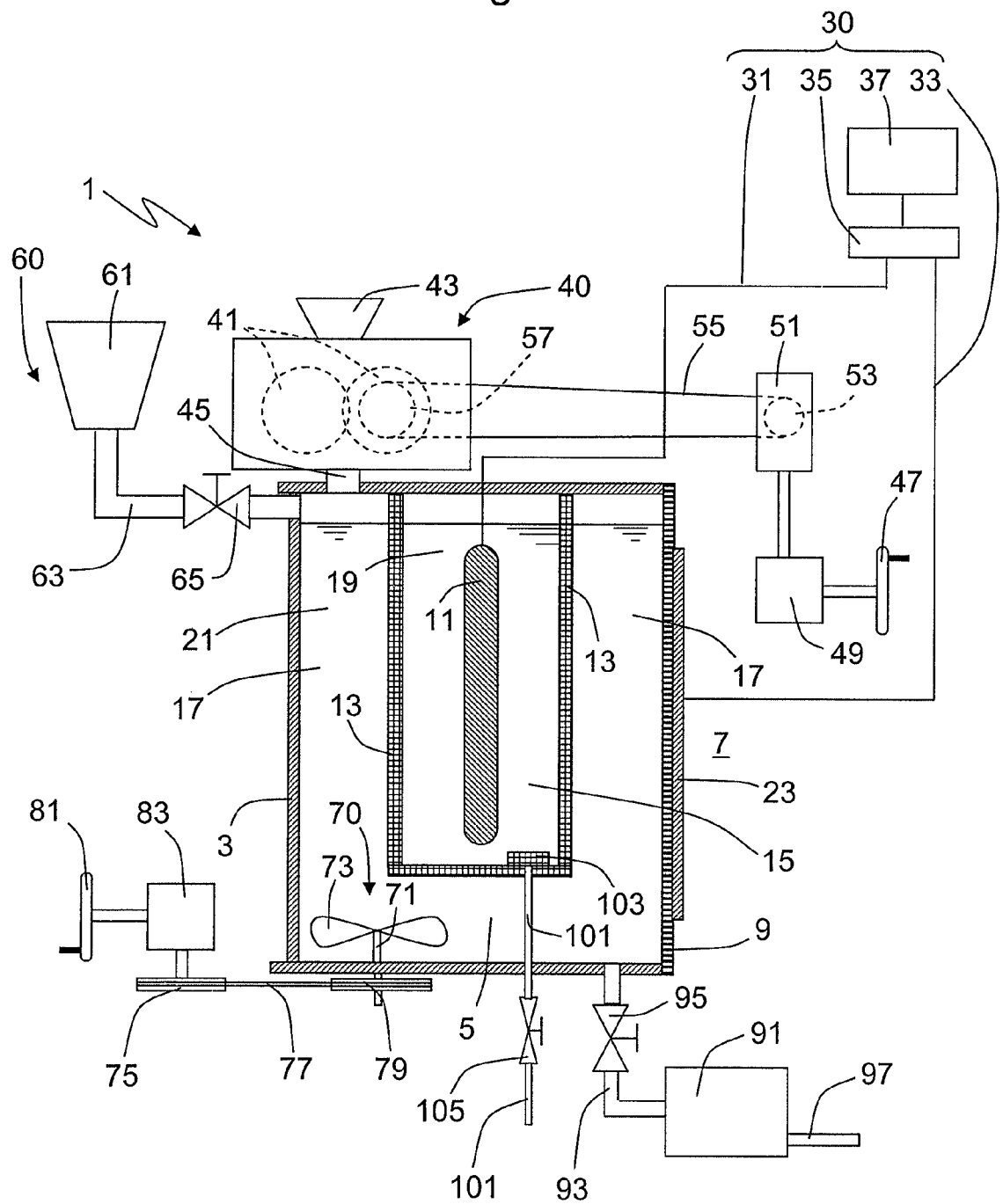
FIG. 3 is a schematic view of the biofuel cell in a second embodiment.

Referring to FIG. 3, in the second embodiment, unlike the first embodiment, a bottomed cylindrical mesh 13 is provided in the negative electrode region 5. The negative electrode region 5 is separated by this mesh 13 into an electrode region 15 located in the central part of the negative electrode region 5 and a crushed material region 17 located in the peripheral part of the negative electrode region 5. Due to this configuration, the bottom and entire circumference of the electrode region 15 are adjacent to the crushed material region 17, so that the electricity generation efficiency can be advantageously raised.

A negative electrode 11 forming an overall bar shape is provided in the negative electrode region 5.

In the second embodiment, the stirrer 70 is disposed at the bottom of the negative electrode region 5. The stirrer 70 has a second hand-turned handle 81 independent from the crusher 40, a driving pulley 75 connected to the second hand-turned handle 81 through a decelerator 83, and a driven pulley 79 connected to the driving pulley 75 through a drive belt 77. The driven pulley 79 is connected to the stirring shaft 71. When the second hand-turned handle 81 is rotated, the stirring shaft 71 rotated, as a result, the stirring blade 73 is rotated, whereby degradation of the crushed material 21 introduced into the crushed material region 17 is promoted.

Other components and operations of the biofuel cell 1 in the second embodiment are the same as those in the first embodiment.

(Third Embodiment)

Figure 4:
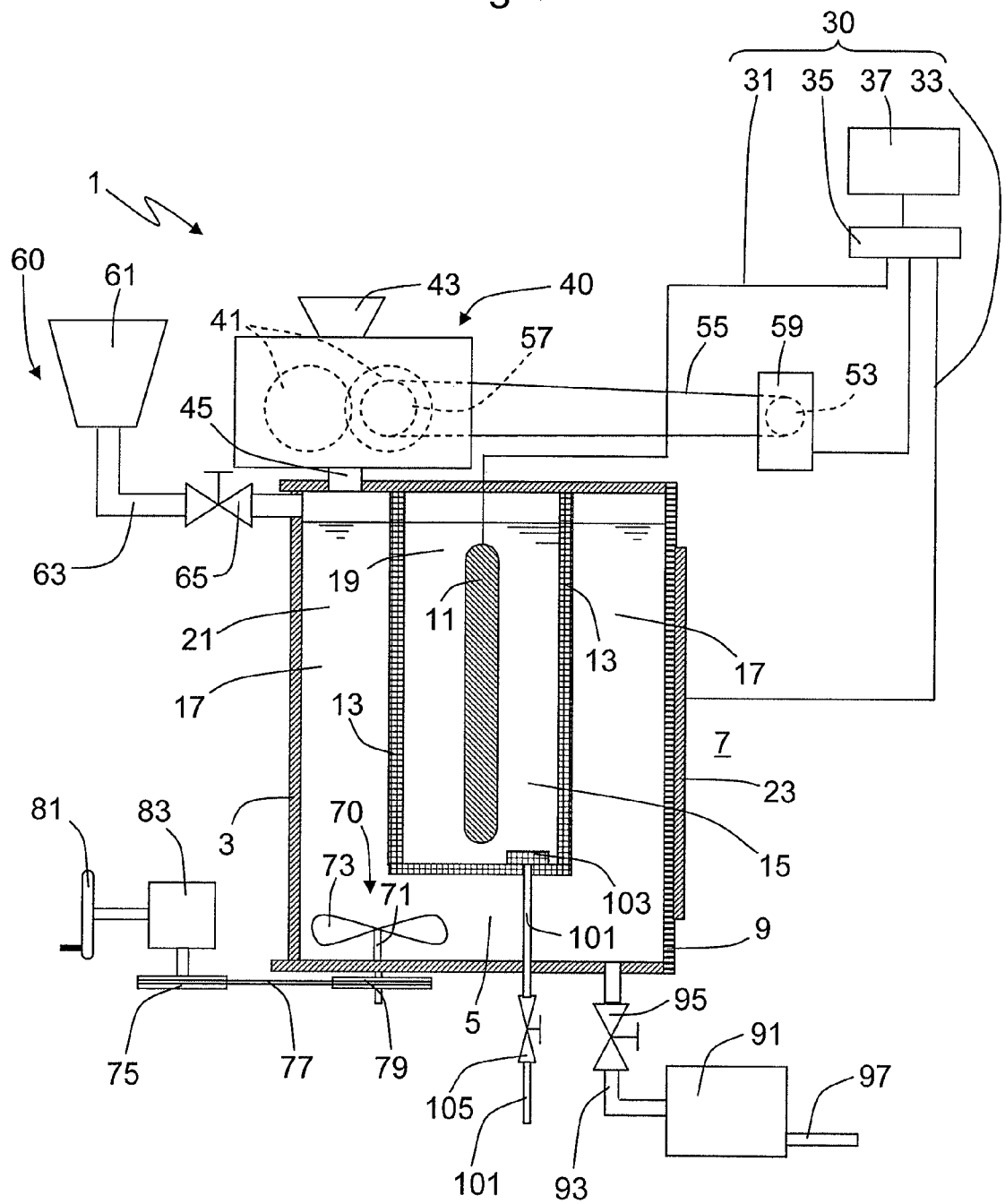
FIG. 4 is a schematic view of the biofuel cell in a third embodiment.

Next, the biofuel cell 1 in a third embodiment is described below by referring to FIG. 4. As for the third embodiment, only different points from the second embodiment are explained.

In the biofuel cell 1 of the third embodiment, an electric motor 59 connected to the driving pulley 53 is provided. The electric power obtained in this biofuel cell 1 is supplied to the electric motor 59 through the electronic control circuit 35. This configuration is advantageous in that an electric power from outside is not necessary or can be reduced.

In another embodiment, an electric motor for driving the stirrer 70 is provided, and this electric motor 59 is operated by utilizing the electric power obtained in the biofuel cell 1.

In the embodiments described above of the present invention, pulp contained in a disposable diaper waste is used as the fuel of the biofuel cell. However, the disposable diaper waste contains SAP (superabsorbent polymer) where the main component is, for example, a polyacrylic acid. The SAP can be degraded by a biocatalyst, similarly to pulp, and therefore, can be used as the fuel of the biofuel cell in the embodiments according to the present invention. In this case, a biocatalyst suitable for degrading SAP is contained in the sludge.

In the meantime, as a conventional method for recycling a disposable diaper waste, there is a method where a disposable diaper waste is microbially fermented/degraded, dried and sterilized to form a solid fuel and the solid fuel is combusted and thereby is recovered as heat energy and recycled. However, the disposable diaper waste contains water such as in human excrement, and therefore, a significant amount of heat energy is required until the disposable diaper waste dried. Furthermore, there is a problem that, since the final product is a solid fuel and the recycling is realized by combustion, $CO_2$ is emitted, and moreover, because of thermal recycle, its usage/application is limited.

However, in the biofuel cell of the embodiments according to the present invention, the amount of solid material can be reduced owing to biodegradation by a biocatalyst. Also, it is sufficient to control the temperature to such an extent as keeping room temperature (from 20 to 40° C.) so as to ensure the environment for activity of the biocatalyst. Furthermore, electric power that is an energy source having highest versatility is produced and therefore, the biofuel cell can be utilized in a standard home, etc., without any particular apparatus. The embodiments of the present invention are superior in terms of these points to the above-described recycling method.

All features as can be understood by one skilled in the art from the present description, the drawings and the claims, even if these features are described only in connection with certain other features, can be combined individually or further in any combination with others of the features or groups of features disclosed here, unless this feature has been expressly excluded or the technical aspect makes such a combination impossible or meaningless.

DESCRIPTION OF REFERENCE NUMERALS

1: Biofuel cell
3: Negative electrode chamber
5: Negative electrode region
7: Positive electrode region
9: Proton exchange membrane
11: Negative electrode
13: Mesh
15: Electrode region
17: Crushed material region
19: Acclimated sludge (biocatalyst)
21: Crushed material
23: Positive electrode
30: External circuit

The invention claimed is:

1. A biofuel cell for generating electricity by recycling a crushed material of disposable diaper waste, comprising:
  a positive electrode, a negative electrode, and an external circuit electrically connecting the positive electrode and the negative electrode,
  a positive electrode region where the positive electrode is disposed,
  a negative electrode region where the negative electrode is disposed, wherein the negative electrode region houses a biocatalyst together with the crushed material, and
  a proton permeable membrane disposed between the positive electrode region and the negative electrode region,
  wherein the negative electrode region is separated by a mesh into an electrode region and a crushed material region,
  the negative electrode is housed in the electrode region, and the crushed material is housed in the crushed material region.

2. The biofuel cell according to claim 1, wherein the proton permeable membrane is composed of a composite cation exchange membrane containing a cation exchange membrane and an anion exchange layer formed only on a side surface of the negative electrode region of the cation exchange membrane.

3. The biofuel cell according to claim 2, wherein an electron mediator is housed in the negative electrode region.

4. The biofuel cell according to claim 3, wherein the negative electrode is made of a carbon fiber knitted in a lacing-like fashion.

5. The biofuel cell according to claim 2, wherein the negative electrode is made of a carbon fiber knitted in a lacing-like fashion.

6. The biofuel cell according to claim 1, wherein an electron mediator is housed in the negative electrode region.

7. The biofuel cell according to claim 6, wherein an electron mediator feeder for feeding an electron mediator to the negative electron region is further provided.

8. The biofuel cell according to claim 6, wherein the negative electrode is made of a carbon fiber knitted in a lacing-like fashion.

9. The biofuel cell according to claim 1, wherein the negative electrode is made of a carbon fiber knitted in a lacing-like fashion.

10. The biofuel cell according to claim 1, wherein the number of openings of the mesh is from 30 to 200 mesh.

11. The biofuel cell according to claim 1, wherein the crushed material is in a rectangular shape of 5×5 mm to 10×10 mm.

12. The biofuel cell according to claim 1, wherein a crushed material feeder for feeding the crushed material to the crushed material region is further provided.

13. The biofuel cell according to claim 12, wherein the crushed material feeder is further provided with a crusher for crushing a diaper waste.

14. The biofuel cell according to claim 13, wherein the crusher is driven by an electric power supplied from the external circuit.

15. The biofuel cell according to claim 1, wherein a catalyst feeder for feeding a biocatalyst to the negative electrode region is further provided.

16. The biofuel cell according to claim 1, wherein the crushed material region is formed in the central part of the negative electrode region and the electrode region is formed in the peripheral part of the negative electrode region.

17. The biofuel cell according to claim 1, wherein the electrode region is formed in the central part of the negative electrode region and the crushed material region is formed in the peripheral part of the negative electrode region.

18. The biofuel cell according to claim 1, wherein a stirrer is further provided in the crushed material region.

19. The biofuel cell according to claim 1, wherein the positive electrode is a platinum electrode, a copper electrode, an iron electrode, a gold electrode or a titanium electrode.

20. The biofuel cell according to claim 1, wherein the positive electrode region is the atmosphere.

* * * * *